Nov. 13, 1962  R. L. JAESCHKE  3,063,532
ELECTROMAGNETIC COUPLING WITH COOLING MEANS
Filed Feb. 15, 1960  3 Sheets-Sheet 1

INVENTOR.
RALPH L. JAESCHKE
BY
Jagno & Stover
ATTORNEYS

Nov. 13, 1962 R. L. JAESCHKE 3,063,532
ELECTROMAGNETIC COUPLING WITH COOLING MEANS
Filed Feb. 15, 1960 3 Sheets-Sheet 2

INVENTOR.
RALPH L. JAESCHKE
BY Jeagno & Stover
ATTORNEYS

Nov. 13, 1962   R. L. JAESCHKE   3,063,532
ELECTROMAGNETIC COUPLING WITH COOLING MEANS
Filed Feb. 15, 1960   3 Sheets-Sheet 3
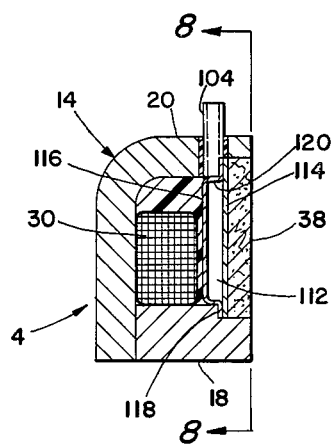
*Fig. 7*
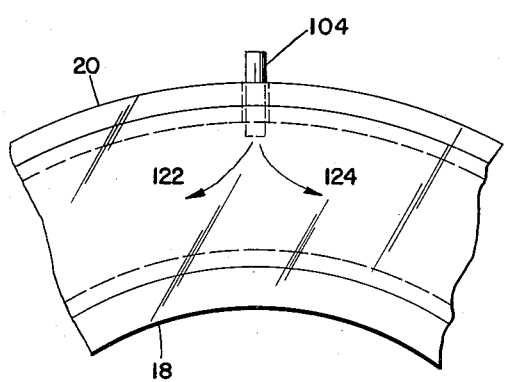
*Fig. 8*
| TEST NO. | MAGNET ASSEMBLY TEMP. | | | WATER TEMP. | | WATER VOLUME GPM | PEAK TORQUE LBS. FT. | STOPPING TIME IN SEC. | AVE. TORQUE LBS. FT. |
|---|---|---|---|---|---|---|---|---|---|
| | 90 | 92 | 94 | IN | OUT | | | | |
| 1) 4 S/M | 150° F. | 58° F. | 142° F. | 37° F. | 58° F. | .137 | 128 | 1.08 | 84.5 |
| 2) 4 S/M | 340° F. | 266° F. | 266° F. | — | — | 0 | 76 | 1.40 | 69.6 |
| 3) 4 S/M | 190° F. | 64° F. | 204° F. | 36° F. | 79° F. | .056 | 102 | 1.17 | 75 |
| 4) 4 S/M | 176° F. | 66° F. | 190° F. | 36° F. | 56° F. | .114 | .116 | 1.18 | 74.5 |
*Fig. 9*
INVENTOR.
RALPH L. JAESCHKE
BY *Jeagno & Stover*
ATTORNEYS

United States Patent Office 3,063,532
Patented Nov. 13, 1962

3,063,532
ELECTROMAGNETIC COUPLING WITH
COOLING MEANS
Ralph L. Jaeschke, Kenosha, Wis., assignor to Eaton
Manufacturing Company, Cleveland, Ohio, a corporation of Ohio
Filed Feb. 15, 1960, Ser. No. 8,560
10 Claims. (Cl. 192—113)

This invention relates to cooling electromagnetic coupling devices of the kind which utilize members responsive to friction as a means for transmitting torque for driving or braking purposes.

More specifically, this invention includes a combination air-liquid cooled magnetic-friction type coupling which employs a novel liquid carrying shield disposed between the field coil and friction facing of a field coil housing assembly.

It is therefore a broad object of the present invention to provide a novel cooling means for dissipating heat in an electromagnetic coupling device.

A more specific object of the invention is the provision of a liquid carrying shield disposed within the field coil housing assembly of an electromagnetic coupling of the character described whereby the shield acts as a physical barrier against the transmission of heat to the field coil and also serves as a liquid coolant carrier for heat dissipation.

A further object of the invention is the provision of a liquid cooled field coil housing assembly in a magnetic friction type coupling wherein the torque capacity and equipment life is substantially increased.

Another object is the provision of a liquid cooled field coil housing assembly of the character described whereby the coefficient of friction of the friction facing material is substantially increased by decreasing the temperature of the associated structural elements.

Other objects of the invention, advantages and its characteristic features will be in part apparent and in part apparent and in part pointed out as the description progresses.

Excessive heat generated in electromagnetic friction-type couplings has long been recognized as producing a deleterious effect on the associated structural elements of devices of this character and in addition, it creates a severe limitation on operability. In the prior art, cooling means for devices of the type described have been primarily restricted to structure directing air circulation along exposed surfaces of frictional contacting elements and air-cooled friction type couplings of this nature are satisfactory in many applications. I have discovered, however, that in low speed applications such as those involving tensioning and high inertias, heat dissipation becomes a critical consideration.

By providing a novel liquid cooled, heat dissipating shield within the field coil housing assembly of an electromagnetic friction type coupling, the shield not only aids and protects the field coil from overheating by acting as a physical barrier between the field coil and the friction facing, but excessive heat emanating from both the field coil and the friction facing is rapidly transmitted to, and dissipated by, the liquid coolant flowing therein.

The foregoing advantages and features of the invention will be apparent from the description of the air-liquid cooled structure, various illustrations of which are shown in the following drawings:

FIGURE 7 illustrates still another form of the invention utilizing a fabricated reservoir; and FIGURE 8 is a fragmentary sectional view along directional lines 8—8 of FIGURE 7 showing the displacement of the reservoir.

FIGURE 9 is a chart illustrating test results of an electromagnetic friction coupling with and without liquid cooling.

Figure 1:
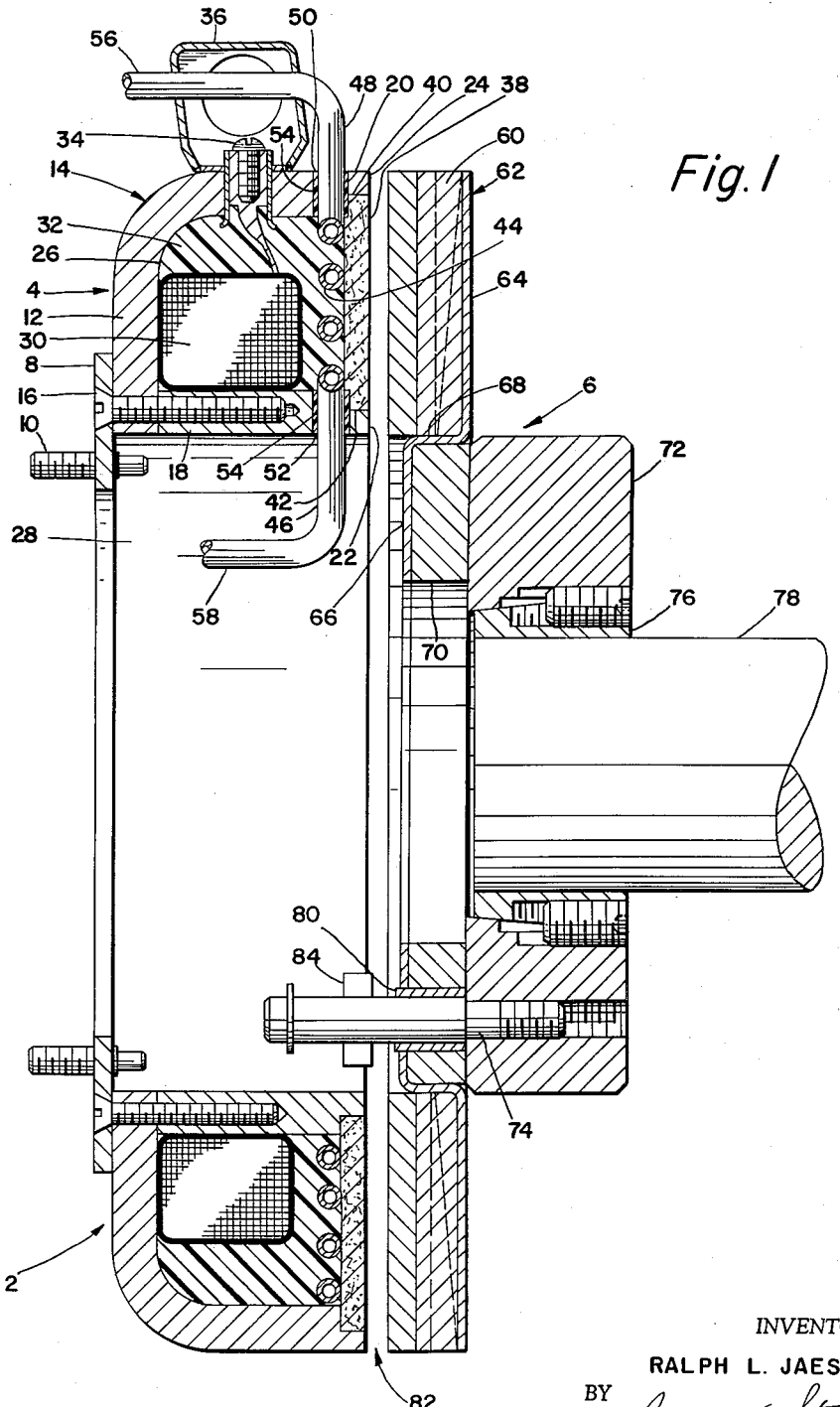
FIGURE 1 is a cross-sectional view of an electromagnetic friction coupling or the like embodying the present invention.

Although the invention is susceptible to various alternative constructions, the following description described herein and shown in the drawings are the preferred embodiments. It is distinctly understood, however, that the scope of my invention is not intended to be limited by such disclosure and covers all alternative constructions and modifications as set forth in the appended claims.

Referring now to one embodiment of the invention, FIGURES 1 to 4 inclusive show an electromagnetic coupling 2 which comprises a magnet assembly 4 and an armature assembly 6.

For purposes of illustration, the coupling 2 is disclosed as a brake having the magnet assembly 4 normally mounted in a fixed relationship to a motor end frame or a machine member; however, the invention is equally applicable to electromagnetic clutches and the like wherein torque is transmitted by the engagement of the magnet assembly and the armature assembly, both rotating members. The armature assembly 6 therefore, is the rotating member in the braking device illustrated and the magnet assembly 4 is non-rotatable.

The magnet assembly 4 comprises an annular mounting plate 8 which is mounted on a fixed frame by means of axially extending screws 10. The mounting plate 8 is also secured to one leg 12 of an annular pole structure 14 by means of axially extending screws 16. The annular pole structure 14 comprises a pair of inner and outer poles 18 and 20 having radially spaced annular pole faces 22 and 24 directed toward the armature assembly 6. The inner axial end of the annular pole 18 lies adjacent the inner edge of the annular leg 12, and the outer pole 20, having an angular cross-sectional shape, is disposed in an extending position with the annular leg 12.

The pole members 18 and 20 together with leg 12 form an annular U-shaped magnetic circuit and enclosed therein is an annular channel-shaped recess 26. The inner pole 18 extends in an axial relationship toward the mounting plate 8 and is annularly disposed around a chamber or central opening 28.

The magnet assembly 4 also includes a field coil 30 annularly disposed in the recess 26 and when energized establishes lines of flux in the electromagnetic coupling 2. The field coil 30 is insulated from the annular pole structure 14 by an insulating material such as epoxy resin 32 and the ends of the coil 30 are connected to suitably insulated terminals located on the pole structure 14 by screw 34. The terminals are connected to a suitable power source (not shown) within a terminal box 36. The magnet assembly 4 further includes an annular friction lining 38 preferably recessed within the pole structure 14 and is supported by annular seats 40 and 42. The outer surface area of the friction lining 38 is positioned to be substantially flush with pole faces 22 and 24.

The magnet assembly 4 also comprises a continuous coiled tubing 44 annularly disposed within the recess 26 between the outer section of the field coil 30 and the inner surface area of the friction lining 38. The tubing includes a plurality of spaced turns 44 and the inside surface area of the friction lining 38 is located adjacent each turn in a tangential relationship. The continuous coiled tubing has two ends 46 and 48 and each end is positioned in part through two cylindrical apertures 50 and 52. The apertures 50 and 52 have a diameter slightly in excess to the diameter of tubing ends 46 and 48 and are radially located through the respective pole members 18 and 20 and lie in the same plane as the coiled tubing turns 44. The epoxy resin 32, disposed as an insulating material around the field coil 30, also lies between each tubing turn 44 and between the tangential contacting lines of the friction lining 38 and the tubing turns 44 thereby acting as a physical bond. The tubing may be made of any suitable material, such as aluminum, which has an excellent bond strength with the epoxy resin 32. For purposes of properly insulating the tubing from the pole members 18 and 20, a suitable insulation 54 such as rubber or aluminum oxide may be disposed within apertures 50 and 52 between the inserted parts of tubing ends 46 and 48 and the pole members 18 and 20. A voltage will be induced in the tubing as current in the field coil changes during energization and deenergization thereof; this condition and the resultant increase in time constant is eliminated, however, by properly insulating the tubing ends from the respective poles.

A liquid coolant supply means (not shown) is connected to the upper extremity 56 of tubing end 48 and is used as a liquid inlet and the lower extremity 58 of tubing end 46 is a liquid outlet or drain.

The armature assembly 6 is shown to include an outer ring shaped portion comprising a plurality of armature segments 60 having a radial width extending across the annular pole faces 22 and 24 which cooperate to complete a magnetic circuit when the field coil 30 is energized. An armature plate 62 of a disc-type configuration is provided and includes a radially disposed ring portion 64, an inner hub section 66 and an axial recess section 68.

The armature segments 60 are mounted in fixed spaced relationship to one another on the ring portion 64 of the armature plate 62. A substantially flat filler ring 70 is positioned with its inner surface area adjacent the inner hub section 66 and its outermost axially disposed surface area adjacent the axial recess section 68 of the armature plate 62. The armature assembly 6 also comprises an annular mounting hub 72 attached to the filler ring 70 by means of a plurality of equally spaced guide pins 74. A taper-lock bushing 76 is pressed into the mounting hub 72 and a shaft 78 is suitably locked within the taper-lock bushing 76 by means of a key, not shown. The armature assembly 6 is therefore mounted in a conventional manner on the shaft 78 so that it will be axially shiftable toward and away from the pole structure 14 as well as being rotatable with the shaft 78.

To permit the axial movement of the armature assembly 6, a plurality of axially extending circumferentially spaced guide pins 74 and ring 70 are provided with bushings 80. The bushings 80 are retained on the guide pins 74 in a conventional manner such that the cooperation between each guide pin 74 and associated bushing 80 permits the armature assembly to be axially shiftable.

An air gap 82 having a predetermined width separates the adjacent faces of the armature assembly 6 and the pole structure 14 when the field coil 30 is deenergized. As shown in FIGURE 1, the armature assembly is in a disengaged position. A spring device 84 is located on each guide pin 74 and comprises a pair of extending spring arms (not shown) which are resiliently flexible and extend under tension to the adjacent surface of the inner hub 66.

Upon energization of the field coil 30, the armature assembly 6 is axially shiftable towards the magnet assembly 4 and the spring arms of spring device 84 are flexed by the displacement of the inner hub section 66; upon deenergization of the field coil, the spring arms tend to disengage the armature assembly 6 from the magnet assembly 4. The spring devices which form no part of this invention, also automatically compensate for variations in the air gap width as more fully explained in my copending application Serial No. 712,451, now United States Patent No. 2,973,850 issued March 7, 1961.

Figure 2:
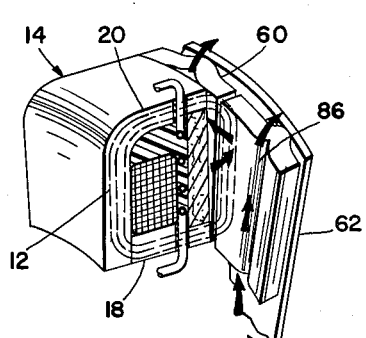
FIGURE 2 is a perspective view illustrating a partial section of the armature and field coil housing assembly of FIGURE 1.

FIGURE 2 is a fragmentary perspective view of the magnet assembly 4 and includes armature segments 60 and a portion of armature plate 62. One armature segment 60 is shown in an engaged position with the pole structure 14 and the flux path is represented by closed dashed lines in pole 20, leg 12, pole 18, and armature segment 60. The armature segments 60 are shown to include depressed radial recesses 86 throuh which circulating air is permitted to flow for dissipating excessive heat generated by the physical contact of the rotating armature segments 60 and the adjacent surface area of the pole structure 14. The heavy arrows 88 are indicative of the normal air flow paths.

Figure 3:
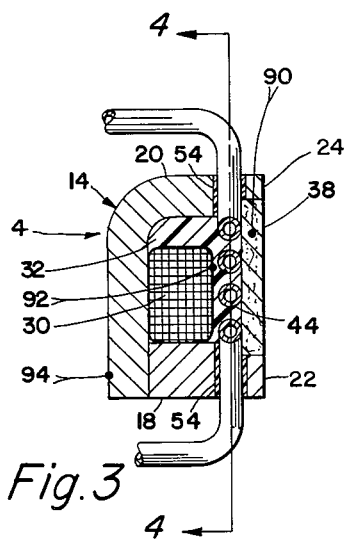
FIGURE 3 is a partial sectional view of FIGURE 1 showing the field coil housing assembly.

FIGURE 3 is a partial sectional view of the magnet assembly 4 and for purposes of clarity includes only the annular pole structure 14, the field coil 30, the friction lining 38, the continuous coiled tubing 44 and the aperture insulation 54. The sectional view of the annular pole structure 14, FIGURE 3, is shown to include the annularly wound continuous tubing 44 with the ends thereof protruding through poles 18 and 20. Epoxy resin 32 is disposed as a bonding agent between each tubing turn 44 and also functions as an insulating body within the magnet assembly 4.

Figure 4:
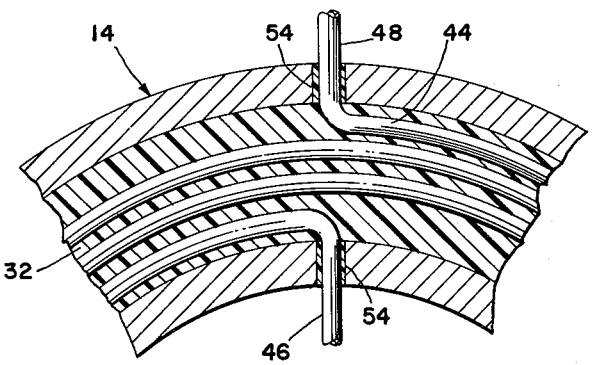
FIGURE 4 is a fragmentary sectional view along lines 4—4 of FIGURE 3 illustrating the tubing configuration.

The continuous tubing turns 44 shown in the fragmentary sectional view of FIGURE 4, taken along lines 4—4 of FIGURE 3, clearly illustrate the cooling liquid inlet means 48 and the outlet means 46. Each turn 44 is physically separated from the pole structure 14 by epoxy bonding material 32, such that the tubing 44 does not lend itself to, nor distract from, the working lines of flux in the pole structure 14.

To briefly review the operation of the invention as illustrated in FIGURES 1 through 4, torque is transmitted by friction through the electromagnetic engagement of the armature assembly 6 to the magnet assembly 4. The armature assembly 6 is normally held disengaged from the magnet assembly 4 by a plurality of spring devices 84 which also insure a fixed operation clearance between the normally disengaged assemblies. Upon the instance of energization of the field coil 30 during a braking operation, a magnetic field is created and a closed flux path is established between the pole structure 14 and armature segments 60 as shown by the dashed lines in FIGURE 2. Under normal operating conditions, the generated magnetic flux field attracts the rotating armature assembly 6 to the stationary magnet assembly 4 with sufficient force to transmit torque.

Prior art devices of the character described rely primarily on the flow of cool air between and around the adjacent contacting surface areas of the magnet assembly 4 and the armature assembly 6 to dissipate excessive heat generated by such contact.

Although air cooled electromagnetic friction devices are satisfactory in many applications, the need for a higher degree of heat dissipation arises in couplings operating at lower speeds where windage and convection are at a minimum. In low speed applications such as tensioning, the armature assembly rotates at a speed insufficient to create a forced air draft capable of dissipating heat at an acceptable rate to prevent a deleterious effect on the coupling's associated structural elements. Overheating the friction lining reduces its coefficient of friction, with a resultant decrease in torque. More importantly, the thermal limitation of a coupling of the character described is determined by the temperature limitation of the field coil insulation. Since this is relatively low, e.g., 250° F., temperatures above this figure are extremely harmful to the longevity of the field coil which is an expensive item and costly to replace.

To eliminate the deleterious effects of excessive heat as hereinabove described, a novel liquid carrying continuous tubing 44 is disposed within the magnet assembly 4 between the field coil 30 and the friction lining 38 and is substantially tangentially flush with the latter. The entire magnet assembly lying within the recess 26 is totally encapsulated with an epoxy resin 32 which acts as a heat transmitting means. Since the coiled tubing 44 and friction lining 38 lie in parallel planes and are substantially adjacent, tangential contact points are made between the inside surface area of the friction lining 38 and the surface area of each tubing turn adjacent thereto. It becomes evident from the configurations shown in FIGURES 1 through 4 that the plurality of spaced, liquid-carrying tubing turns act as a physical shield, shielding means or barrier between the field coil 30 and the heat sensitive friction lining 38.

The unique displacement of the tubing turns 44 not only aids and protects the field coil 30 from overheating by acting as a physical barrier between said field coil and said friction lining, but heat dissipated from the friction lining 38 and the field coil 30 is rapidly transmitted to the liquid cooled tubing via the epoxy resin 32. The epoxy resin therefore performs two basic functions which includes a means for rapidly transmitting heat from both the friction facing 38 and the field coil 30 to the liquid cooled tubing 44 and also acts as a natural bond to unite the entire assembly together. An advantageous feature of the invention lies in disposing the tubing turns 44 substantially adjacent the inner side of the friction lining 38 thereby allowing the liquid coolant to conduct heat in an efficient manner without affecting the operational characteristic of the friction lining.

Test results listed in FIGURE 9 were derived by installing thermocouples 90, 92 and 94 (FIGURE 3) within the friction lining 38, adjacent the outer surface area of the field coil 30 and on the outside surface area of the pole structure 14 respectively. An electromagnetic friction test brake was installed with an inertial fly wheel and adequate controls. Tests 1 through 4 were run at four stops per minute using a fly wheel decelerated from 1800 r.p.m. to 0, and the rate of flow of cooling water was varied from 0 to .137 g.p.m. through a continuous aluminum tubing. Test No. 2 (FIGURE 9) conducted without the flow of cooling water resulted in substantially higher temperatures at contact points 90, 92 and 94, the peak torque was found to be substantially lower, the stopping time was longer and the average torque was found to be substantially lower than when the brake was tested utilizing the flow of water in the continuous aluminum tubing as shown in Test Nos. 1, 3 and 4. Other test results indicated that without the use of the water cooled tubing the coefficient of friction between the magnet assembly and the armature assembly was reduced as much as 75%.

In conjunction with the operation of my invention, a suitable liquid such as water or oil may be used. The number of turns in the continuous tubing and the distance between each turn is dependent upon the diameter of the tubing, the tubing material and the lineal dimensions between the poles. Aluminum tubing is preferably used since the bond strength between epoxy resin and aluminum is strong and aluminum has excellent heat transfer characteristics.

Figure 5:
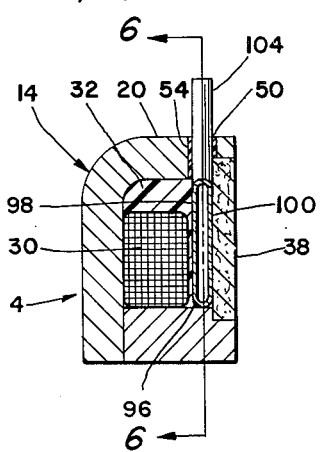
FIGURE 5 illustrates another form of the invention including a sectional view of a field coil housing assembly with a modified liquid cooling tube.
Figure 6:
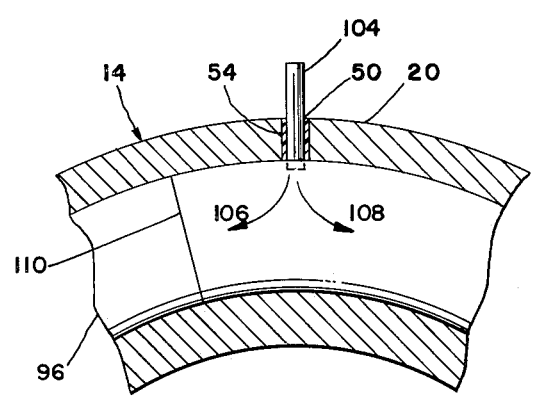
FIGURE 6 is a fragmentary sectional view along lines 6—6 of FIGURE 5 showing the configuration of the tubing within the field coil housing assembly.

FIGURES 5 and 6 of the drawings show a liquid cooled magnet assembly 4 of an electromagnetic friction coupling which is usable for the same purposes and in the same manner as the magnet assembly 4 in FIGURE 3, and it is substantially identical thereto. It differs from the construction illustrated in FIGURE 3 in that a ring-like tubing 96, having parallel sides 98 and 100, is disposed within the magnet assembly 4. The tubing resembles a hollow, flattened doughnut and is annularly disposed with the tubing side 100 substantially adjacent the inner surface area of the friction lining 38. Tubing side 98 faces the outer side of field coil 30 and the entire assembly is encapsulated with epoxy resin 32 similar to the continuous coiled tubing configuration of FIGURE 3. A cylindrical aperture 50 is located at the uppermost position of pole member 20 in the same plane as the annularly disposed tubing 96 and a liquid coolant inlet 104 protrudes therethrough and is suitably sealed to the tubing 96. The inlet 104 is properly insulated from the pole member 20 by insulation 54 and a liquid coolant outlet (not shown) is disposed through the pole member 20, 180° from the inlet 104 in a similar manner. The connecting ends of the flattened tubing may be joined in a suitable manner such as a butt welded joint shown by the line 110 in FIGURE 6.

A liquid supply means, not shown, attached to the upper inlet 104 introduces liquid through the tubing 96 in two directions as indicated by arrows 106 and 108 in FIGURE 6 and is forced out through the lower outlet, not shown.

FIGURES 7 and 8 of the drawings disclose a further modification of the invention in that a liquid reservoir 112 is disposed within the magnet assembly 4 between the field coil 30 and the friction lining 38. The reservoir 112 is of a fabricated structure and comprises an annularly disposed plate or wall 114 recessed within the pole structure 14 and has its outside face substantially adjacent the entire inside surface area of the friction lining 38. Securely mounted to plate 114 and forming a part of the reservoir 112 is an annularly disposed inner wall 116. The inner wall 116 includes a radially disposed flange member 118, recessed within the pole structure 14 and has its outside surface area rigidly secured to the recessed portion of the plate 114. The inner side of the flange member 118 is adjacent portions of pole members 18 and 20. The inner wall 116 also includes an axial recess section 120 adjacent the innermost radial surface areas of the pole members 18 and 20. The structure illustrated in FIGURE 7 is otherwise similar in scope to the associated elements shown in FIGURE 5 including an insulated liquid inlet 104 attached to the reservoir 112, a liquid outlet (not shown) and a totally encapsulated magnet assembly. The flow direction of the liquid coolant is illustrated in FIGURE 8 by arrows 122 and 124.

As noted in FIGURE 5, the surface area of a portion of the flattened tubing 96 lies adjacent the inside surface area of the friction lining in an intimate relationship and the contacting area with the friction lining is substantially greater than the tangential contact points of the tubing 44 shown in FIGURE 3.

The flattened tubing 96 shown in FIGURE 5 has certain advantageous features. Since the primary objects of the invention are to rapidly dissipate heat generated at the friction lining 38 and to protect the field coil 30 from excessively high temperatures, the construction of the flattened tubing 96 affords a substantially complete physical barrier between the friction lining 38 and the field coil 30.

A similar advantageous feature is shown in FIGURE 7 wherein the reservoir 112 affords an even larger physical barrier or shielding means between the friction lining 38 and the field coil 30 since its annularly disposed outer plate 114 is flush with the entire inside surface area of the friction lining 38. It becomes apparent therefore, that a portion of the reservoir 112 affords a more intimate contact with the friction lining 38 than the continuous coil arrangement shown in FIGURE 3 or the flattened tubing configuration disclosed in FIGURE 5. In each configuration, however, the barrier or shield also aids materailly in supporting the inner wall of the friction lining, the epoxy disposed between the barrier and the friction lining prevailing as a bonding material.

Unlike the continuous coiled tubing 44 (FIGURE 3) in which each turn is insulated from each other and from the pole structure 14, the upper and lower extremities of the flattened tubing 96 (FIGURE 5) and the fabricated reservoir 112 (FIGURE 7) are in direct physical contact with, and are seated on, the pole members 18 and 20.

To minimize the possibility of a voltage being induced in the flattened tubing 96 or the reservoir 112 upon energization and deenergization of the field coil, this condition and the resultant increase in time constant may be eliminated by utilizing a suitable non-conductive interrupting or breaking means (not shown) in the flattened tubing or reservoir and yet retain the totally enclosed features of the liquid carrying barriers. A simple alternative means of securing comparable results is to use a high resistance material such as brass for the liquid carrier.

From the accompanying drawings and the foregoing detailed description, it will now be readily understood that this invention provides a novel construction for an electromagnetic coupling or the like in which a liquid coolant carrier means is provided in a totally encapsulated magnet housing assembly and is effective to rapidly dissipate excessive heat generated during the operation of such coupling. In addition, it will be apparent that the liquid carrier means also protects the field coil by acting as a physical barrier against excessive heat. It will also now be understood that this invention has provided a novel combination air-liquid cooled electromagnetic coupling.

While the particular embodiments of the present invention have been shown and described, it will be obvious to those skilled in the art that changes and modifications may be made without departing from this invention in its broader aspects and therefore, the aim in the appended claims is to cover all such changes and modifications as fall within the true spirit and scope of this invention.

I claim:

1. In an electromagnetic friction device, a magnet assembly comprising an annular U-shaped pole structure, said structure including a pair of radially spaced magnetizable pole members each having a respective pole face, a friction material annularly disposed between said pole members and having one side thereof substantially flush with said pole faces, a field coil located within said magnet assembly, means for energizing said coil, and a continuous shielding means annularly disposed between the field coil and the friction material, the latter being substantially flush with said shielding means, said shielding means structurally formed for conveying a liquid coolant, a liquid coolant inlet and outlet means connected to said shielding means, a heat transmitting bonding means disposed within said magnet assembly for transmitting heat generated from said field coil and said friction material to said shielding means, said shielding means constituting a physical shield between said friction material and said field coil.

2. In an electromagnetic friction device comprising a magnet assembly and an engageable armature assembly, said magnet assembly having a pair of radially spaced, annularly disposed pole members each having a respective pole face, said pole members each having a recessed portion adjacent each pole face, a friction material having two sides and being annularly located between the pole members and seated in said recessed portions with one side thereof substantially flush with said pole faces, an energizable field coil positioned within said magnet assembly, a totally enclosed liquid carrying shielding means having a tubular-like configuration located between said field coil and said friction material, liquid inlet and outlet means connecting said shielding means and nonconductive, heat transmitting bonding means disposed within said magnet assembly between said field coil, said shielding means, said friction material and said pole members, wherein excessive heat generated by said field coil and said friction material is dissipated by said liquid coolant, said armature assembly including a radially extending ring engageable with said pole members to complete a magnetic circuit when said field coil is energized.

3. In an electromagnetic friction device as set forth in claim 2 wherein the liquid inlet and outlet means are disposed through separate apertures in said magnet assembly and insulation means disposed between said apertures and said inlet and outlet means.

4. In an electromagnetic friction device as set forth in claim 2 wherein said shielding means comprises an annularly disposed, continuously coiled tubing having a plurality of spaced turns, each turn lying within the same plane and each turn being tangentially adjacent said friction material.

5. In an electromagnetic friction device as set forth in claim 2, wherein said shielding means comprises an annularly disposed substantially flattened ring-like tubing extending between said pole members, said tubing being substantially flush with the other side of said friction material.

6. In an electromagnetic friction device as set forth in claim 2, wherein said shielding means comprises an annularly disposed fabricated reservoir having substantially parallel first and second walls, said first wall extending between the recessed portions of said pole members and disposed adjacent the other side of said friction material, said second wall projected toward said field coil and having a U-shaped configuration with an extending flange member, said flange member being seated within said recessed portion of said pole members and secured to the recessed portion of said first wall.

7. In an electromagnetic coupling or the like comprising a magnet assembly and a normally disengaged, rotatable armature assembly, said magnet assembly having a pair of annular, radially spaced magnetizable pole members each having a respective pole face, a friction material having an inner and an outer face and being annularly disposed between said pole members and having said outer face substantially flush with said pole faces, an annularly wound energizable field coil located betwene said pole members, a liquid coolant carrier means annularly disposed within said magnet assembly between said field coil and the inner face of said friction material, inlet and outlet means connected to said carrier means and a heat transmitting bonding means disposed within said magnet assembly, said armature assembly comprising a shaft driven annular ring having a plurality of armature segments thereon, said segments radially extending across said pole faces and engageable therewith upon the instance of energization of said field coil whereby excessive heat is readily dissipated from said coupling by the discharge of a heat absorbing liquid flowing through said carrier means and by air circulated by said rotating armature assembly, said liquid carrier means acting as a physical barrier between said friction material and said field coil.

8. In an electromagnetic coupling as set forth in claim 7 wherein said carrier means comprises a continuously coiled tube having a plurality of turns, each turn tangentially adjacent the inner face of said friction material.

9. In an electromagnetic coupling as set forth in claim 7 wherein said carrier means comprises a flattened tubing having a pair of substantially parallel sides, one parallel side thereof located adjacent the inner face of said friction material and the other parallel side extending towards said field coil.

10. In an electromagnetic coupling as set forth in claim 7 in which said carrier means comprises a fabricated reservoir having a first and a second side, said first side including a ring-like plate adjacent the inner face of said friction material and said second side having a U-shaped channel with extending flanges, said flanges securely positioned with said plate, the base of said U-shaped channel being substantially parallel with said first side and positioned toward said field coil.

References Cited in the file of this patent

UNITED STATES PATENTS

| | | |
|---|---|---|
| 513,420 | Rowland | Jan. 23, 1894 |
| 956,164 | Pick | Apr. 26, 1910 |
| 2,197,990 | Winther | Apr. 23, 1940 |
| 2,620,900 | Du Rostu | Dec. 9, 1952 |
| 2,791,308 | Barnett et al. | May 7, 1957 |
| 2,884,107 | Frankel | Apr. 28, 1959 |
| 2,911,071 | Gelleke | Nov. 3, 1959 |
| 2,949,991 | Jaeschke | Aug. 23, 1960 |